United States Patent

[11] 3,601,007

[72] Inventor Jurgen Korth
  7 Birkenweg, 3001 Berenbostel, Germany
[21] Appl. No. 778,389
[22] Filed Nov. 25, 1968
[45] Patented Aug. 24, 1971
[32] Priority Nov. 24, 1967
[33] Germany
[31] P 16 03 847.4

[54] PNEUMATICALLY OPERATED FASTENER DEVICE
7 Claims, 2 Drawing Figs.

[52] U.S. Cl. .................................................. 91/165,
  91/415, 91/461, 227/130
[51] Int. Cl. ....................................................F15b 15/17,
  F15b 11/08, F15b 13/042
[50] Field of Search........................................... 91/461,
  304, 165, 417 A, 415, 417, 47; 227/130

[56] References Cited
UNITED STATES PATENTS

| | | | |
|---|---|---|---|
| 3,173,340 | 3/1965 | Doyle et al. | 91/461 X |
| 2,995,113 | 8/1961 | Steiner | 227/130 X |
| 3,190,189 | 6/1965 | Mosetich | 91/461 X |
| 3,255,674 | 6/1966 | Nelson et al. | 91/461 |
| 3,351,257 | 11/1967 | Reich et al. | 227/130 |
| 3,375,758 | 4/1968 | Novak et al. | 91/461 X |
| 3,406,889 | 10/1968 | Cast et al. | 227/130 |
| 3,407,709 | 10/1968 | Bade | 227/130 X |
| 3,427,928 | 2/1969 | Bade | 227/130 X |

FOREIGN PATENTS

| | | | |
|---|---|---|---|
| 930,364 | 7/1963 | Great Britain | 227/130 |

Primary Examiner—Martin P. Schwadron
Assistant Examiner—Irwin C. Cohen
Attorney—Hibben, Noyes & Bicknell ABSTRACT: In a pneumatically operated fastener device with a movable piston which is returned by compressed air to its initial position, a differential piston valve means is provided to cause a pressure difference between compressed air supplied to one side of the piston and compressed air supplied to the other side of the piston for moving the piston from an extended position to its initial position. The difference in pressure is obtained by a control element which slides in a supply passage and is guided in a bushing engaging the housing of said device.

Patented Aug. 24, 1971
3,601,007
2 Sheets-Sheet 1
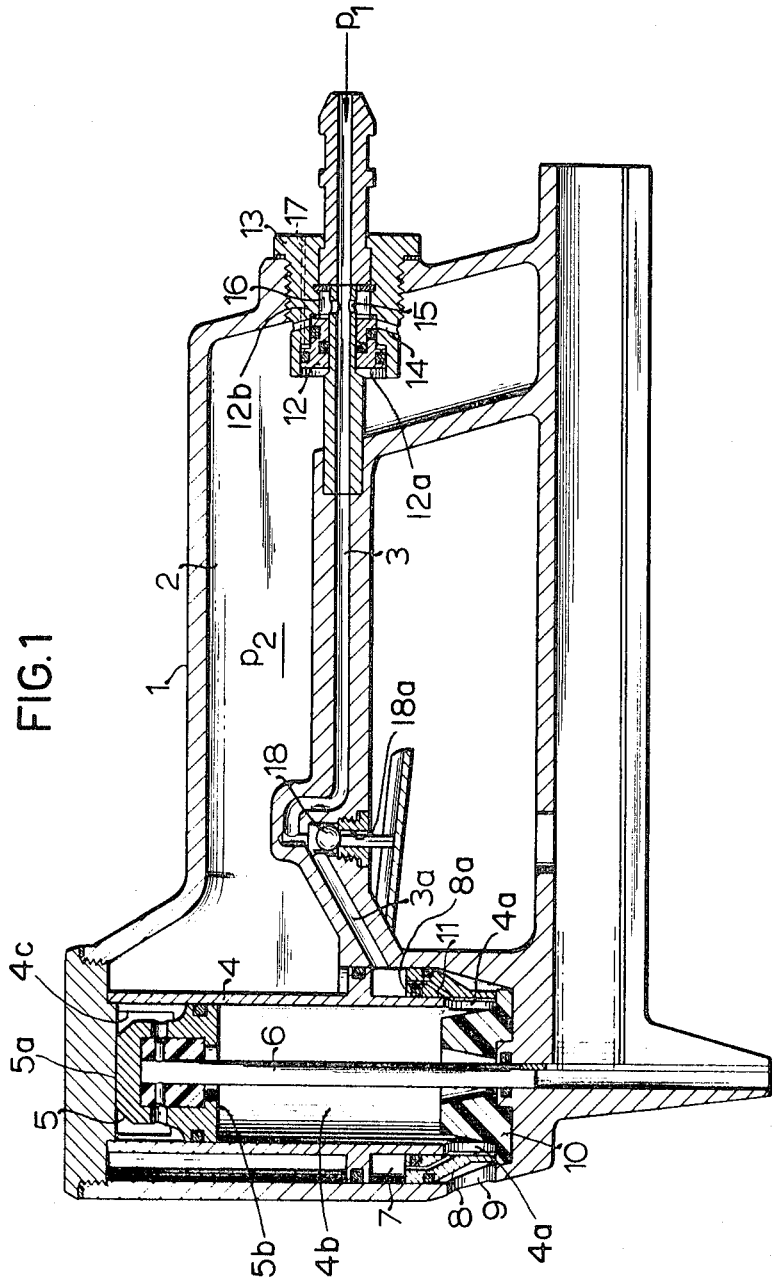
INVENTOR
JÜRGEN KORTH
by
Hibben, Noyes & Bicknell
ATTORNEYS

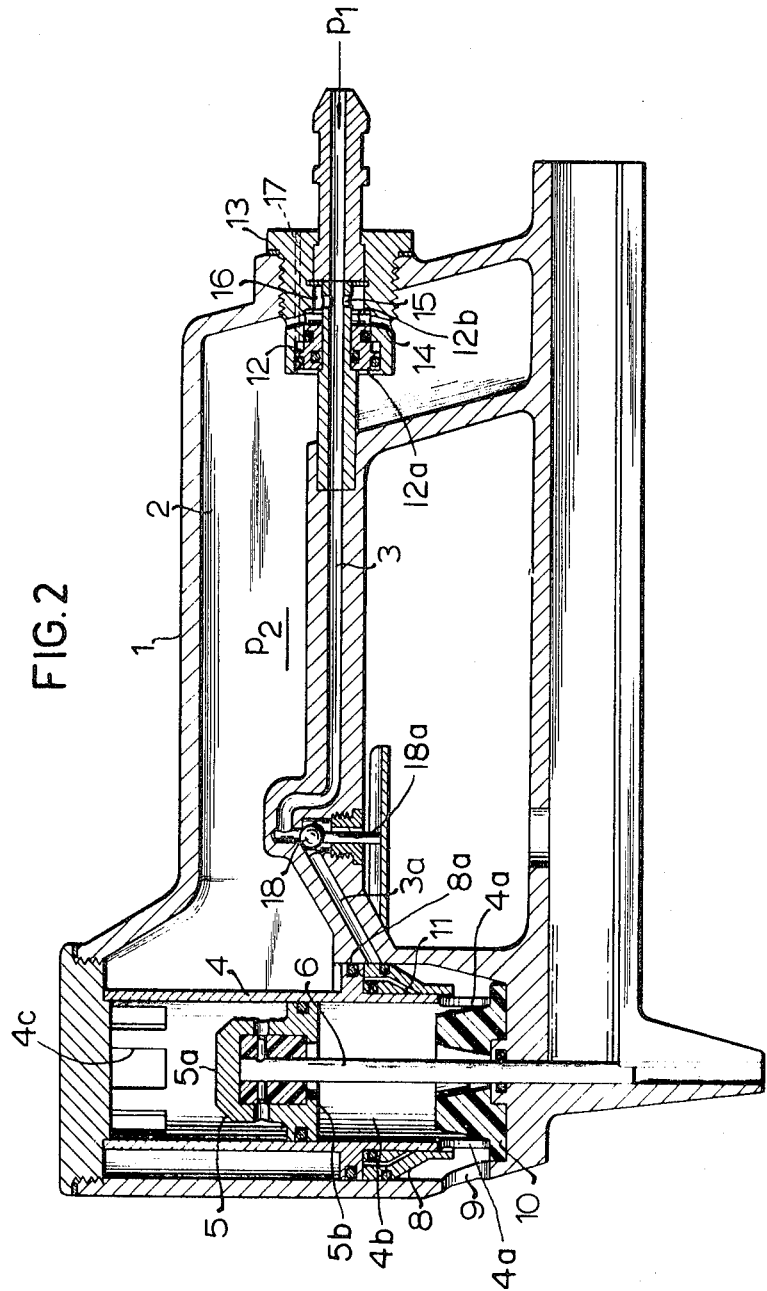

PNEUMATICALLY OPERATED FASTENER DEVICE

The present invention relates to a pneumatically operated fastener device, especially to drive in fastening means, consisting of a housing, a cylinder, a piston movable in said cylinder, a compressed-air storage chamber, and a compressed-air supply passage with a release valve for initiating a working stroke of the piston.

For easy handling, portable pneumatically operated fastener devices for driving in fastening means such as staples, nails, dowels, and the like, should have the lowest weight possible. Different embodiments of the prior art have already tried to achieve this result. A low ratio of the height of a device to the stroke of its piston is essential for low weight. The most unfavorable ratio is obtained, if in a fastener device the inlet valve for the compressed air is arranged at the upper end of the working cylinder. Further the part of the cylinder lying underneath the piston must be ventilated sufficiently, to prevent slowing down the piston. It is true that fastener devices, having the working cylinders ventilated underneath the piston and having the inlet valves above the piston in permanent communication with a compressed-air storage chamber, have the additional advantage of a rapid acceleration of their piston, the mass of which can thus be kept small, resulting in a lower weight of the device. However, the above-mentioned ratio is unfavorable in such embodiments.

It is an object of the present invention to combine in one fastener device both advantages, i.e. having light piston to be accelerated rapidly and having a low ratio of the height of the device to the stroke of the piston.

It is a further object of the present invention to provide a handy device, which can be actuated with very simple and effective means, wherein said means comprise only few movable control elements to enable a safe and economic working.

According to a preferred embodiment of the invention, means are provided to supply the compressed air out of a compressed-air storage chamber of the fastener device into the upper end of the working cylinder and to supply compressed air out of a compressed-air supply passage of said fastener device into the lower end of said working cylinder, whereby means to cause a difference in pressure between said compressed-air storage chamber and said compressed-air supply passage are arranged in the fastener device. At the lower end of the working cylinder, communication openings are provided to directly exhaust the working cylinder into the surrounding atmosphere. Said means to cause the difference in pressure consist of a control element arranged at the rear end of the housing between the compressed-air storage chamber and the compressed-air supply passage of said fastener device.

These and other objects of the invention will become apparent from the following description in connection with the accompanying drawings. In the drawings, FIG. 1 is a longitudinal section of the device according to the present invention with the piston in its initial position;

FIG. 2 is a longitudinal section of the device with the piston having covered a part of its working stroke.

The fastener device comprises a housing 1, a compressed-air storage chamber 2, tubular means providing a compressed-air supply passage 3, a working cylinder 4 with a piston 5 having two sides 5a and 5b, and a stem 6. By an annular channel 7 the working cylinder 4 is separated from housing 1. In the annular channel 7 a blocking slide 8 for closing ventilation openings 9 is arranged. The slide is movable the direction of the axis of the cylinder into one position blocking the openings 9 and into a second position exposing the openings. an elastic bumper 10 at the bottom of working cylinder 4 serves for damping the stroke of the piston 5 on abutting on the bumper 10. In order to enable the compressed air to enter into the cylinder for the return stroke to be performed, ducts 11 are arranged in the annular blocking slide or piston 8. An automatic control element or differential piston 12 having pressure surfaces 12a and 12b of different areas is arranged in the compressed-air supply passage 3. The bushing or sleeve 13 engages the housing 1 and has openings 14 for the passage of compressed air via the openings or bores 15 from the compressed-air supply passage 3 into an annular space 16 and thence through openings 14 into chamber 2. The bushing 13 houses and guides the control element 12 which is slidable on the tubular means providing the passage 3. So that the control element 12 can move or slide easily within the bushing 13, a ventilation bore 17 is arranged in the bushing. By manually actuating a trigger-operated release valve 18 the compressed-air supply passage 3 may be blocked and at the same time part 3a of the compressed-air supply passage is exhausted through clearance 18a around the stem for valve 18 (FIG. 2). As soon as the part 3a of the supply passage is exhausted, the blocking slide 8 is pushed upwardly by the pressure $P_1$ present in the lower part or end 4b of the cylinder, the compressed air in the lower part 4b escapes immediately out of cylinder 4 through cylinder ports 4a and openings 9 into the atmosphere, and the piston 5 actuated by the pressure $P_2$ acting on one side 5a of the piston pushes the stem 6 downwards. As the upper part of cylinder 4 is permanently in communication with the storage chamber 2, by the parts 4c, the pressure $P_2$ is continuously decreasing when the piston moves in its downward stroke until the piston 5 abuts on the elastic bumper 10. When a certain value of pressure $P_2$ is reached, the control element 12 is shifted to a position to the left, since the force caused by the pressure $P_2$ acting on the surface 12a is less than the force caused by the pressure $P_1$ acting on the surface 12b, and opens the communication between the compressed-air supply passage 3 and the storage chamber 2 through the bores 14 and 15 which along with the annular space 16 form air passage means.

Thereby the pressure $P_2$ rises again and when the force acting on the surface 12a surpasses the force acting on the surface 12b, the control element 12 is shifted to a position, thus interrupting the communication between compressed-air storage chamber 2 and compressed-air supply passage 3. The area of the surface 12a is greater than the area of the surface 12b, and the areas are sized so that pressure $P_2$ is always maintained smaller than pressure $P_1$ in the supply passage 3, whereby on opening the valve 18 (FIG. 1) the piston 5 can be returned into its initial position by the pressure $P_1$ acting on the other side 5b of the piston. At the beginning of the return stroke the annular blocking slide 8 is again pushed downwardly by the pressure $P_1$ acting on the surface 8a to place the ducts 11 in communication through ports 4a with the lower part 4b of the cylinder (FIG. 1) and to block the ventilation openings 9.

Although the present invention has been described with reference to a particular embodiment thereof, it should be understood that those skilled in the art may make other modifications and embodiments which will fall within the spirit and scope of the principles of this invention.

What I claim is:

1. A pneumatically operated fastener driving device comprising: a housing; a cylinder in said housing; a main piston in said cylinder movable in a working stroke toward one end of said cylinder and movable in a return stroke toward the opposite end of said cylinder; a compressed-air storage chamber in said housing in permanent communication with said chamber in said housing in permanent communication with said piston at said opposite end of said cylinder; a compressed-air supply passage extending into said housing and communicating with said one end of said cylinder; a manually operated valve in said supply passage movable between actuated and unactuated positions; exhaust means communicating with said one end of said cylinder for exhausting air into the atmosphere during the working stroke; air passage means for admitting air from said supply passage into said storage chamber; and automatic differential pressure responsive control means for regulating the flow of air through said air passage means and regulating the air pressure in said storage chamber to a pressure always less than the air pressure in said supply passage; movement of said valve to its actuated position causing interruption of the supply of air from said supply passage to said one end of said cylinder and causing air to escape from said one end of said cylinder through said exhaust means, whereby said main piston is moved in its working stroke by the air pressure in said storage chamber; and movement of said valve to its unactuated position causing air to be supplied from said supply passage to said one end of said cylinder and causing closing of said exhaust means, whereby said main piston is moved in its return stroke by the air pressure in said supply passage.

2. A pneumatically operated fastener driving device comprising: a housing; a cylinder in said housing; a main piston in said cylinder movable in a working stroke toward one end of said cylinder and movable in a return stroke toward the opposite end of said cylinder; a compressed-air storage chamber in said housing in permanent communication with said piston at paid opposite end of said cylinder; a compressed-air supply passage extending into said housing and communicating with said one end of said cylinder; a manually operated valve in said supply passage movable between actuated and unactuated positions; exhaust means at said one end of said cylinder for exhausting air from said one end into the atmosphere only during the working stroke; air passage means for admitting air from said supply passage into said storage chamber; and automatic control means for regulating the flow of air through said air passage means, said control means including a differential piston control element having surfaces of different areas exposed to the pressures in said storage chamber and said supply passage, respectively; movement of said valve to its actuated position causing interruption of the supply of air from said supply passage to said one end of said cylinder and causing air to escape from said one end of said cylinder and causing air to escape from said one end of said cylinder through said exhaust means, whereby said main piston is moved in its working stroke by the air pressure in said storage chamber; said control element being movable in one direction to open said air passage means in response to the decrease in air pressure in said storage chamber during the working stroke, thereby restoring the air pressure in said storage chamber, and said control element thereafter being movable in the opposite direction to close said air passage means in response to the increase of pressure in said storage chamber so that the pressure in said storage chamber is always less than the pressure in said supply passage; and movement of said valve to its unactuated position causing air to be supplied from said supply passage to said one end of said cylinder and causing closing of said exhaust means, whereby said main piston is moved in its return stroke by the air pressure in said supply passage.

3. A device as in claim 2, wherein the surface area of said differential piston control element which is exposed to the pressure in said supply passage is less than the surface area exposed to the pressure in said storage chamber.

4. A device as in claim 2, wherein said differential piston control element is annular and said supply passage is defined by tubular means extending through said differential piston control element, said differential piston control element being slidable on said tubular means to a first position blocking said air passage means and to a second position opening said air passage means for either preventing or permitting flow from said supply passage to said storage chamber.

5. A device as in claim 4, further comprising a bushing secured in said housing and extending into said storage chamber, said bushing having a hollow space therein, said tubular means extending through said bushing, said control element being movable in said hollow space, and said air passage means comprising an opening in said bushing communicating between said hollow space and said storage chamber and an opening in said tubular means communicating between said supply passage and said hollow space, said differential piston control element being movable to a position blocking said opening in said bushing to prevent flow of air from said supply passage into said storage chamber.

6. A device as in claim 2, wherein said exhaust means comprises an annular blocking slide located and slidable in an annular channel formed between said cylinder and said housing, said annular channel being connected at one end to said supply passage, ventilation openings being provided in said housing and in said one end of said cylinder, said blocking slide being slidable in said channel to a first position blocking said ventilation openings when compressed air is supplied to said one end of said channel and to a second position opening said ventilation openings when the compressed-air supply to said one end of said channel is interrupted.

7. A device as in claim 6, wherein said blocking slide has a duct therein communicating between said one end of said cylinder and said one end of said annular channel when said blocking slide is in said first position.